(«12») United States Patent
Van Boxtel

(10) Patent No.: US 11,655,660 B2
(45) Date of Patent: May 23, 2023

(54) ROOF SYSTEM FOR A VEHICLE

(71) Applicant: Inalfa Roof Systems Group B.V., Oostrum (NL)

(72) Inventor: Eduardus Christianus Henricus Van Boxtel, Zeeland (NL)

(73) Assignee: INALFA ROOF SYSTEMS GROUP B.V., Oostrum (NL)

(*) Notice: Subject to any disclaimer, the term of this patent is extended or adjusted under 35 U.S.C. 154(b) by 276 days.

(21) Appl. No.: 17/069,474

(22) Filed: Oct. 13, 2020

(65) Prior Publication Data

US 2021/0115719 A1  Apr. 22, 2021

(30) Foreign Application Priority Data

Oct. 16, 2019 (EP) .................................... 19203508

(51) Int. Cl.
*E05D 15/56* (2006.01)
*E05D 15/30* (2006.01)
(Continued)

(52) U.S. Cl.
CPC ............ *E05D 15/565* (2013.01); *B60J 7/043* (2013.01); *E05D 15/30* (2013.01); *B60J 7/024* (2013.01);
(Continued)

(58) Field of Classification Search
CPC ........ E05D 15/565; E05D 15/30; B60J 7/043; B60J 7/0435; B60J 7/024; B60J 7/057; B60J 7/0573; B60J 10/82; B60J 10/84; E05Y 2201/638; E05Y 2201/684; E05Y 2201/626; E05Y 2900/542
(Continued)

(56) References Cited

U.S. PATENT DOCUMENTS 5,527,085 A   6/1996 Ochiai et al.
6,050,632 A   4/2000 Aoki et al.
(Continued)

FOREIGN PATENT DOCUMENTS

DE           4424509 A1   1/1995
DE       102006050851 A1   4/2008
(Continued)

OTHER PUBLICATIONS

European Search Report and Written Opinion in corresponding European Patent Application No. 19203508.7, dated Apr. 7, 2020.

*Primary Examiner* — Dennis H Pedder
*Assistant Examiner* — Joyce Eileen Hill
(74) *Attorney, Agent, or Firm* — Steven M. Koehler; Wetman Champlin & Koehler, P.A.

(57) ABSTRACT

A roof system for a vehicle having a roof opening in a roof part thereof, comprises a closure which is movable by an operating mechanism including at least a guide rail extending in a longitudinal direction of the roof system. A slide which is slidable in the guide rail cooperates at least with a closure support. The slide comprises a body and at least two curves provided in the body and each cooperating with at least a cam. The cams are provided on at least the closure support and the curves have such extent that they cross each other between their ends. The curves are arranged in substantially parallel walls of the body of the slide that face away from each other.

9 Claims, 7 Drawing Sheets

(51) Int. Cl.
   *B60J 7/043*    (2006.01)
   *B60J 7/057*    (2006.01)
   *B60J 7/02*     (2006.01)

(52) U.S. Cl.
   CPC .............. *B60J 7/0435* (2013.01); *B60J 7/057* (2013.01); *B60J 7/0573* (2013.01); *E05Y 2201/638* (2013.01); *E05Y 2201/684* (2013.01); *E05Y 2900/542* (2013.01)

(58) Field of Classification Search
   USPC .... 296/216.02–216.6, 216.08, 221, 222, 223
   See application file for complete search history.

(56)         References Cited

U.S. PATENT DOCUMENTS

| | | | |
|---|---|---|---|
| 10,239,391 B1* | 3/2019 | Heins | B60J 7/0435 |
| 2016/0176273 A1* | 6/2016 | Van Boxtel | B60J 7/0435 |
| | | | 296/216.02 |

FOREIGN PATENT DOCUMENTS

| | | |
|---|---|---|
| DE | 102007003354 A1 | 7/2008 |
| DE | 102014014170 A1 | 3/2016 |
| GB | 2320055 A | 3/1998 |

* cited by examiner

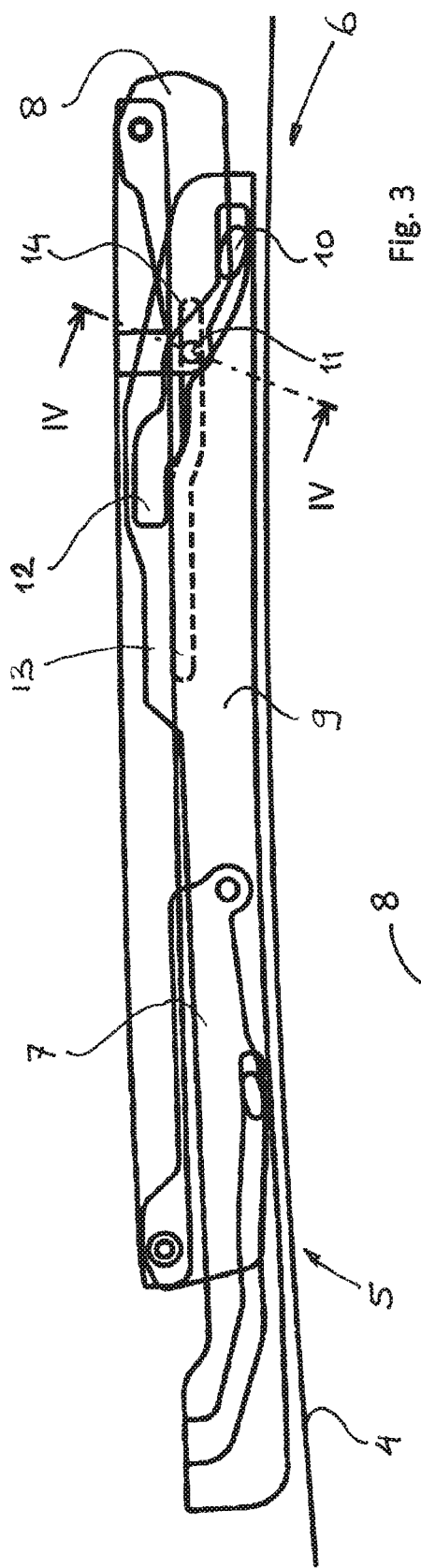
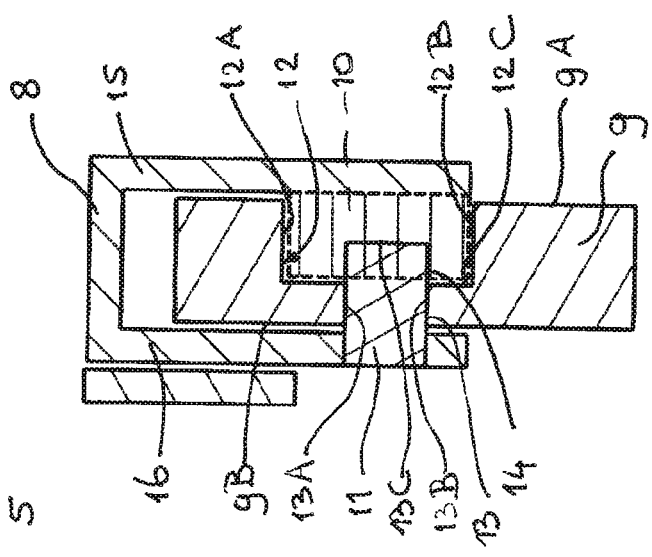

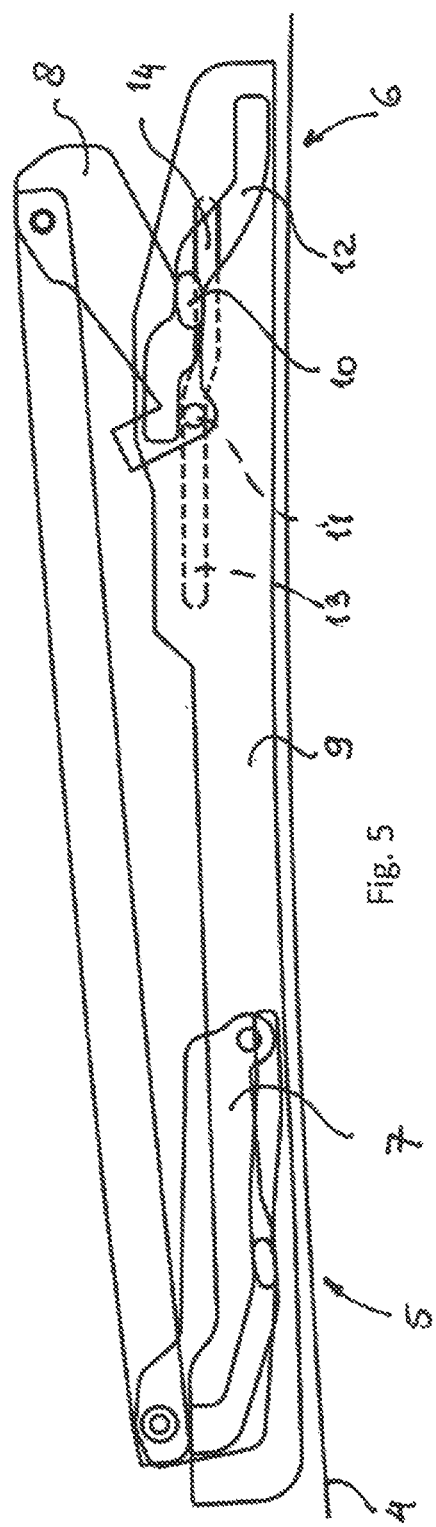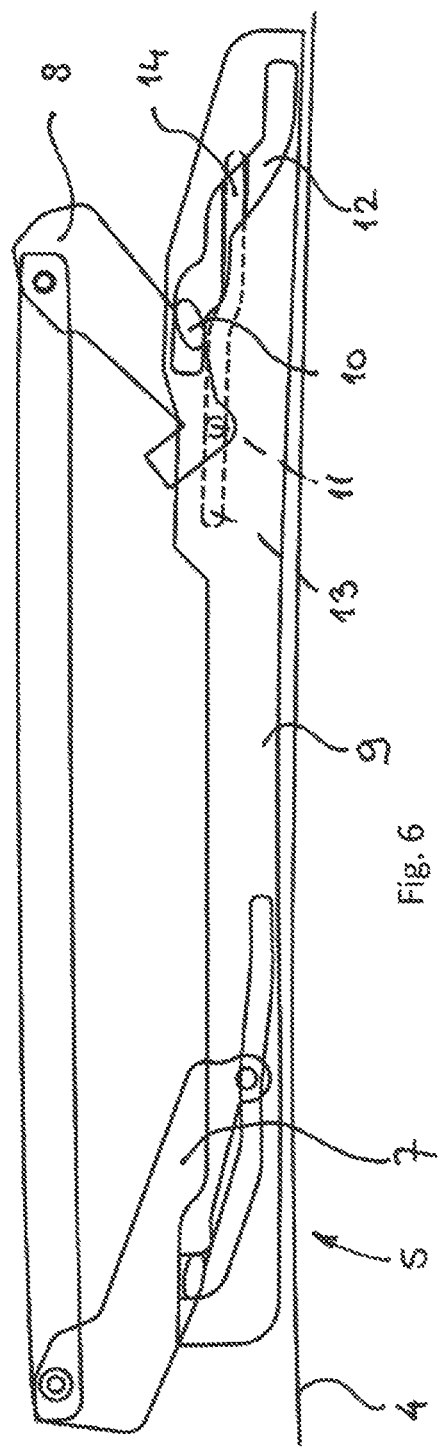

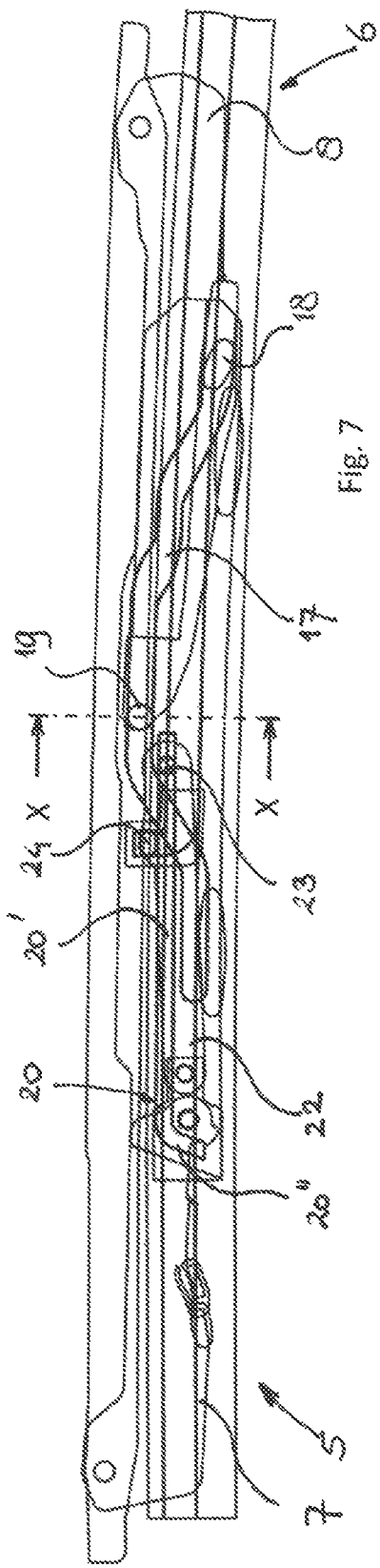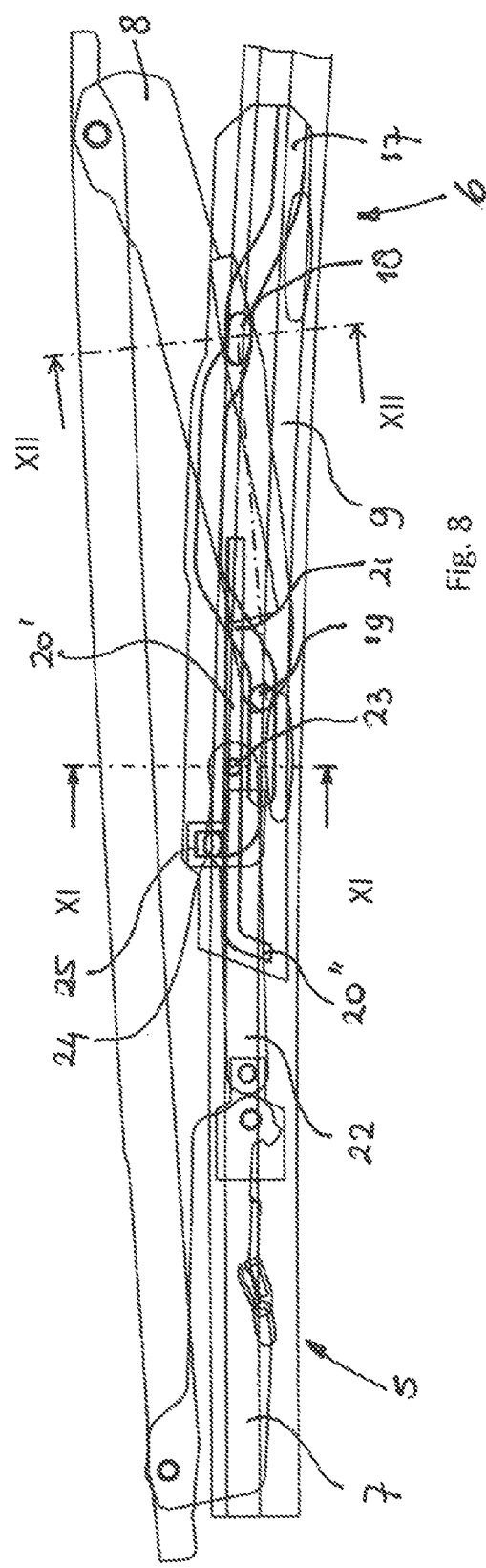

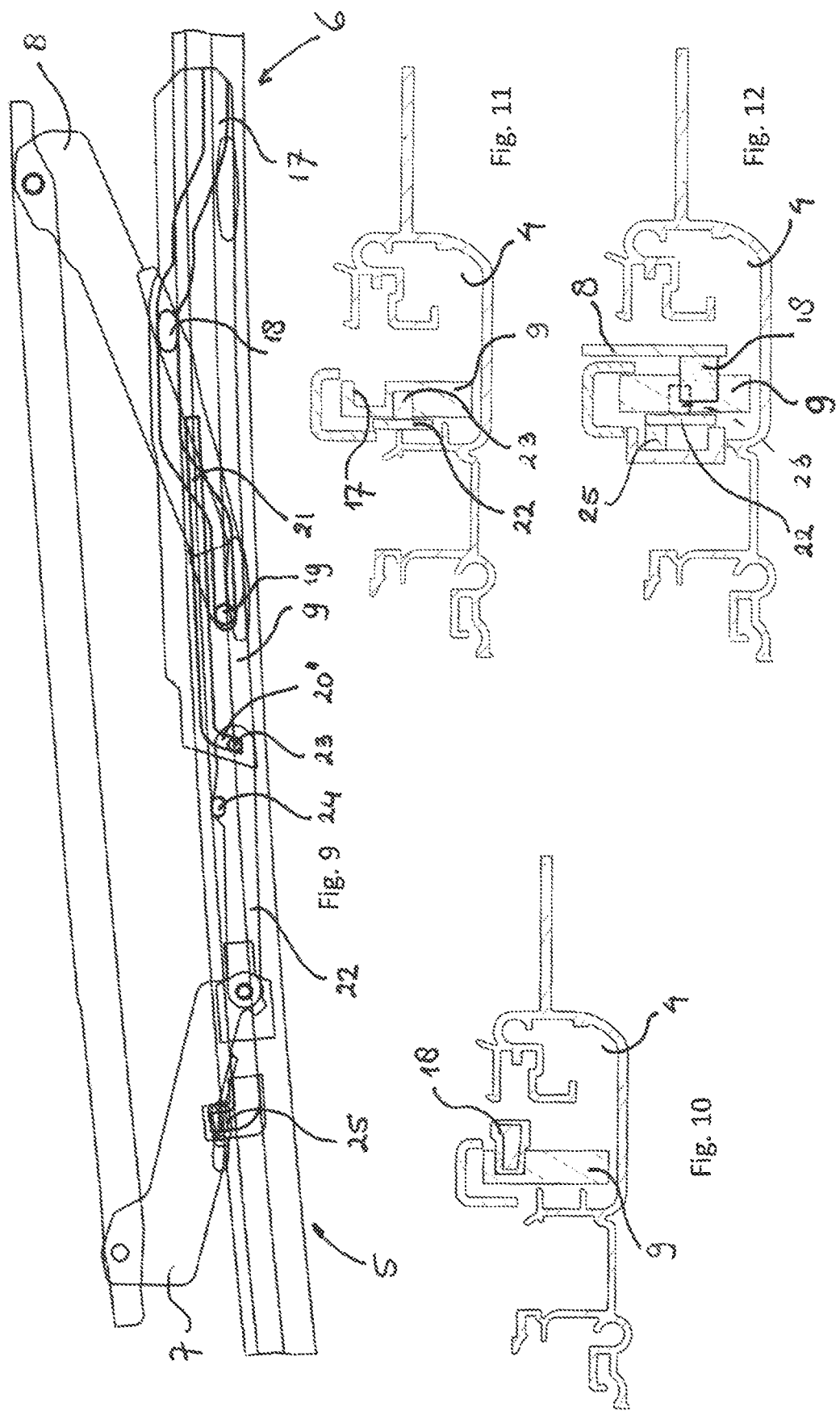

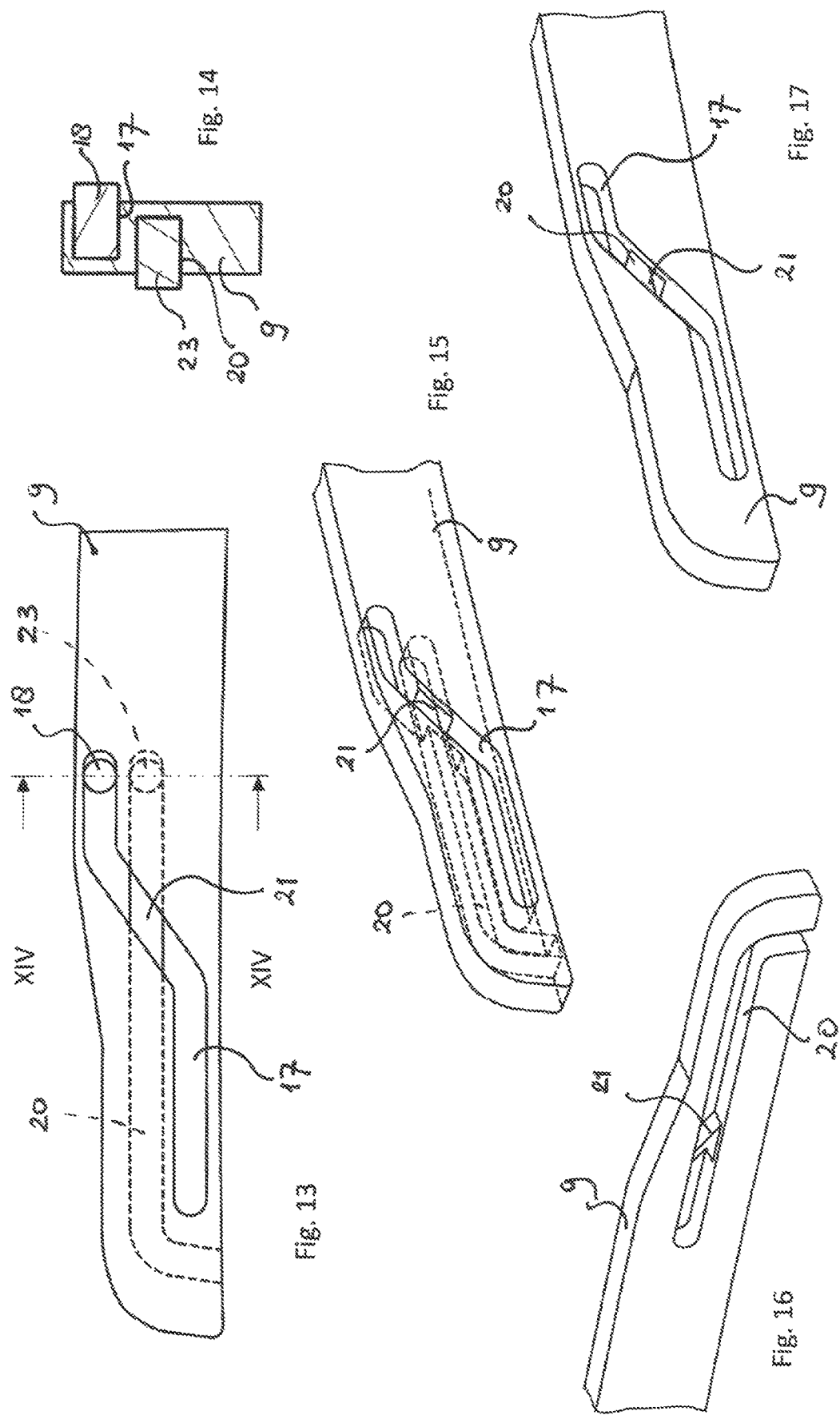

ROOF SYSTEM FOR A VEHICLE

BACKGROUND

The discussion below is merely provided for general background information and is not intended to be used as an aid in determining the scope of the claimed subject matter.

The invention relates to a roof system for a vehicle having a roof opening in a roof part thereof, comprising at least a closure which is movable between a closed position in which it closes the roof opening and an open position in which it opens the roof opening. The closure is movable by an operating mechanism including at least a guide rail extending in a longitudinal direction of the roof system, a closure support and a slide which is slidable in the guide rail and cooperates at least with the closure support. The slide comprises a body and at least two curves provided in the body and cooperating with at least two cams, at least one of the cams being provided on the closure support and the curves having such extent that they are non-parallel and cross each other between their ends.

Such a roof system is known from the prior art. In this prior art roof system, the curves are provided in a wall of the body of the slide and the cams and curves are made such that both cams will stay in their curve when they cross the other curve. This is accomplished for example by making one curve deeper than the other and/or by providing one cam with another cross section than the other cam. The first measure solves the problem for one cam, but not completely for the other one. The second measure may cause problems in other areas, for example if a non-circular cam must move through a bend, the cross-section of the curve must be adapted.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof system for a vehicle having a roof opening in a roof part thereof, comprises a closure which is movable by an operating mechanism including at least a guide rail extending in a longitudinal direction of the roof system. A slide which is slidable in the guide rail cooperates at least with a closure support. The slide comprises a body and at least two curves provided in the body and each cooperating with at least a cam. The cams are provided on at least the closure support and the curves have such extent that they cross each other between their ends. The curves are arranged in substantially parallel walls of the body of the slide that face away from each other.

By providing the curves in opposite walls of the body of the slide that face away from each other, the cams will never be able to enter the other curve because they are on the other side of the body. Therefore, it is easy to use cams in the form of a pin having the same circular cross-section. No additional measures for such cams are required.

The curves and body may have such depth that the curves overlap each other in depth direction of the body of the slide, such that the body will show a through hole at the position where the curves are crossing. Such through hole at the crossing will not interfere as long as the cams are not able to enter it. This is normally not a problem as the cams will not be able to move in a direction perpendicularly to the plane of the curves.

Each curve may thus have a depth that is larger than half of the thickness of the body of the slide, which means that a relatively thin body for the slide may be used and therefore a small Y-package (in transverse direction of the roof system) can be obtained.

In one embodiment, both cams may be provided on the support in the form of a lever, said lever being forked having two legs, one on each side of the slide and carrying one of the cams. In this way the lever of the support may cooperate with both sides of the slide body.

In another embodiment, one cam may be provided on the support to move the support when the slide is driven, and the other cam may be provided on a locking member to lock the slide with respect to the guide rail.

Other embodiments are of course conceivable.

BRIEF DESCRIPTION OF THE DRAWINGS

Further details and advantages of the invention will become more clear from the following description of embodiments of the roof system with reference to the drawings.

FIG. 3 is a side view of detail III in FIG. 2 on a larger scale and showing a part of the operating mechanism on one side of the roof system.

FIG. 4 is a sectional view according to the line IV-IV on a larger scale.

FIGS. 5 and 6 are views similar to that of FIG. 4, but showing the operating mechanism in different positions.

FIGS. 7, 8 and 9 are views similar to that of FIG. 4, but showing a second embodiment of the operating mechanism in three different positions.

FIGS. 10, 11 and 12 are sectional views according to the lines X, XI and XII, respectively, in FIGS. 7 and 8.

FIG. 13 is a simplified side view of a part of a slide in the operating mechanism of FIG. 7 at the position of two crossing curves.

FIG. 14 is a sectional view according to the line XIV-XIV in FIG. 13 on a slightly larger scale.

FIGS. 15, 16 and 17 show the part of the slide of FIG. 13 in three different manners.

DETAILED DESCRIPTION OF THE ILLUSTRATIVE EMBODIMENTS

Figure 1:
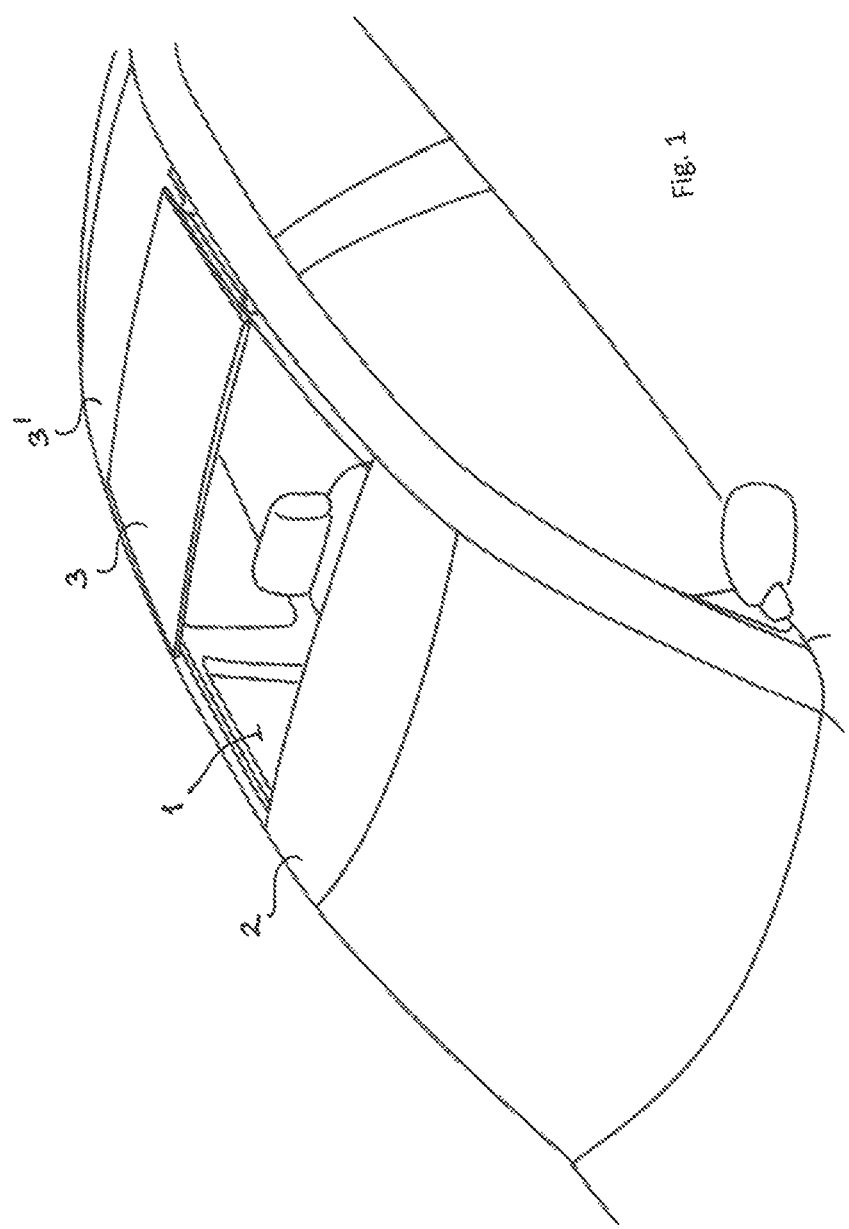
FIG. 1 is perspective view of a vehicle roof comprising an embodiment of a roof system.

FIG. 1 shows part of a vehicle, in particular an automobile, which comprises at least a roof opening 1 defined in a (stationary) roof part 2. A closure, here in the form of a closure panel 3, is movable between a closed position (not shown) in which it closes the roof opening 1, and an open position (as shown) in which it opens the roof opening 1 and in which it is positioned at least partially above the roof part 2, here the fixed roof part adjoining the rear edge of the roof opening 1.

As is known per se such a roof system (which is also known as a top slider roof) could comprise additional elements, such as for example a tiltable wind deflector positioned ahead of the roof opening 1, or further movable or stationary panels, for example in a position behind the panel 3 when it is in its closed position. In fact, in the present embodiment, the roof part behind the roof opening 1 is formed by a roof panel 3' which may be a stationary roof panel or a movable panel.

Figure 2:
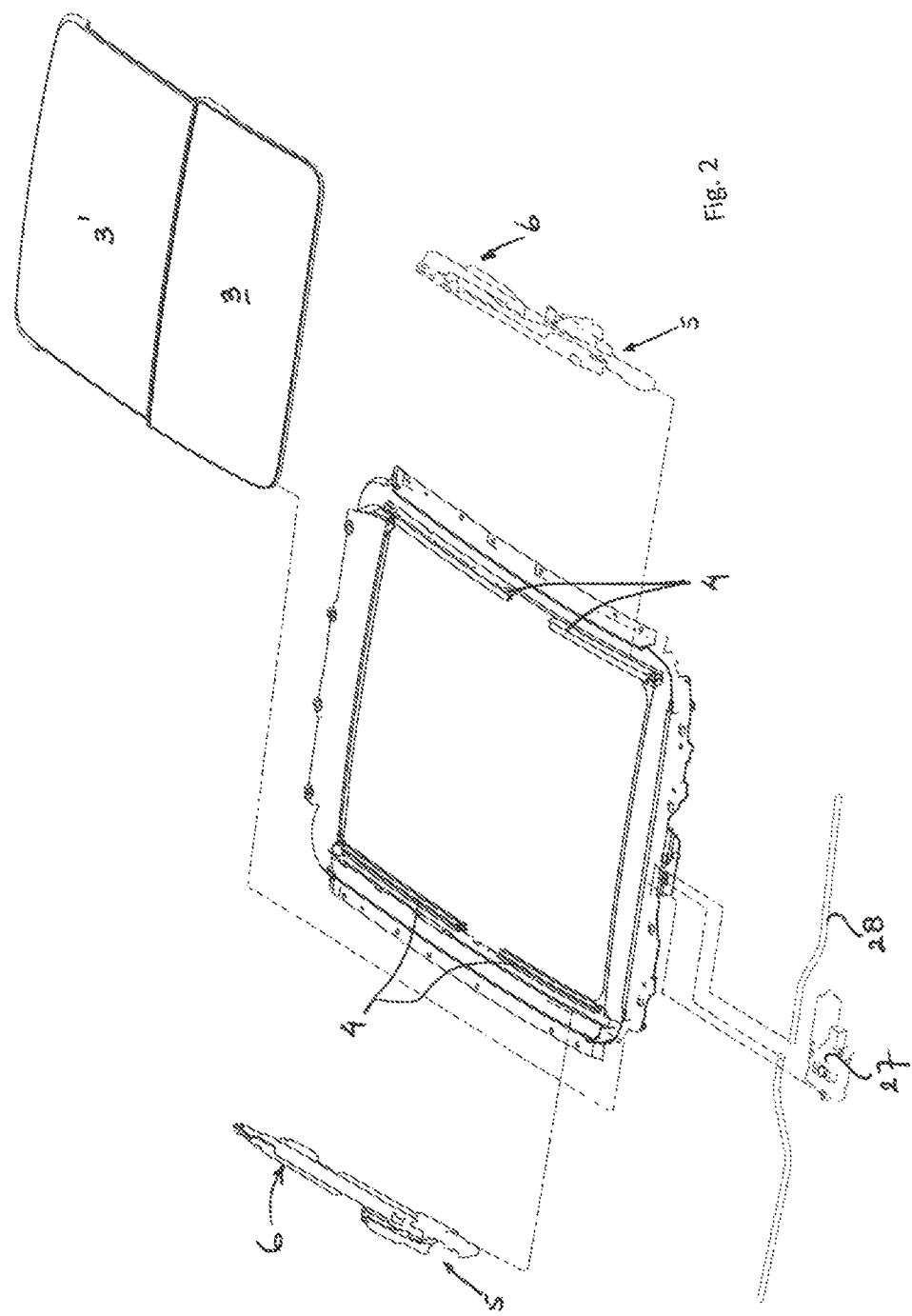
FIG. 2 is a simplified exploded view of the roof system of FIG. 1.

FIGS. 2 and 3 show the parts of an operating mechanism for closure panel 3 in order to move it between the closed and open positions. One of the longitudinal sides of closure panel 3 is shown in FIG. 3, and it is noted that the same parts albeit in mirror image are present on the other longitudinal side of panel 3. The panel 3 comprises a glass or plastic transparent or metal non-transparent sheet supported on the longitudinal sides by a panel bracket fixed to sheet, for example by encapsulation material and/or any other means (not shown). At each longitudinal side edge of roof opening 1 there is provided on a frame 26 or other stationary part a stationary guide rail 4 having several guide grooves in which parts of the operating mechanism are slidably guided. The guide rails 4 are straight or slightly curved in order to follow the curvature of the vehicle roof.

To move closure panel 3 in longitudinal (along the guide rail 4) and vertical (substantially perpendicular to the guide rail 4) directions, the operating mechanism comprises a front device 5 to move the front side of closure panel 3 in vertical direction and a rear device 6 to move the rear side of closure panel 3 in vertical direction, i.e. up and down. Of course, both devices are also used to move closure panel 3 in longitudinal or horizontal direction, i.e. back and forth. The front and rear devices 5, 6 here each comprise a lever 7, 8 respectively as a closure support, the movements of which are controlled by a driving slide 9 guided in a groove in the respective guide rail 4 and driven by an electric motor 27 or the like through elongated drive elements, such as cables 28.

The control of levers 7, 8 by driving slide 9 takes place by cam-curve connections, in the case of lever 8 of rear device 6 by cams 10, 11 on lever 8 engaging guide curves 12, 13 in driving slide 9. As is clear from FIG. 3, guide curves 12, 13 are non-parallel, at least partly inclined and cross each other between their ends as viewed in a side elevation that is normal to longitudinal and vertical movements of the closure panel 3. In order to prevent cams 10, 11 from interfering with the wrong guide curve 13, 12, the guide curves 12, 13 are made into the opposite parallel walls 9A, 9B of the body of driving slide 9. Each curve 12, 13 comprises opposite, substantially parallel side walls 12A, 12B and 13A, 13B and a back wall 12C and 13C, respectively. The back walls 12C, 13C in this case are the walls away from the respective opening in the walls 9A, 9B of the curve 12, 13. The As is shown in FIG. 4, both curve 12 and curve 13 have a depth that is more than half of the thickness of the body of driving slide 9, so that they will overlap each other when seen in a transverse cross-section. As a result they will intersect, resulting into a through hole 14 in the body of driving slide 9 at the point of intersection, so that the curves do not have a back wall at the position of the intersection. This is, however, no problem as long as both cams 10, 11 are not present at the intersection at the same time. FIGS. 3, 5 and 6 show that cams 10, 11 do indeed not interfere. In FIG. 3, cam 11 is at the intersection, i.e. through hole 14, and in FIG. 5, cam 10 has just passed through hole 14, while cam 11 is already a considerable distance from through hole 14.

FIG. 4 also shows how both cams are formed on lever 8. It makes clear that the lower part of lever 8 is forked thereby forming legs 15, 16 straddling driving slide 9, such that cams 10, 11 point towards the inside of legs 15, 16. Of course, cams 10, 11 must not be aligned, but should be offset, as seen in side view, if they are stationary with respect to each other. FIGS. 3 and 4 also show that cams 10, 11 are different in size and cross-section. Cam 10 is larger than cam 11 and has a non-circular cross-section, while cam 10 has a circular cross-section. This is however not necessary on behalf of the crossing curves 12, 13. The depth of curves 12, 13 may also be chosen at will, and therefore may be different or the same, whatever is best for guiding their cams 10, 11. Cams having a circular cross-section are preferred as they need less spacious curves.

FIGS. 7-17 show a second embodiment of the invention. In this embodiment, there is again a driving slide 9 now comprising a single guide curve 17 cooperating with two guide cams 18, 19. There is a locking or coupling curve 20 provided in the other wall of the body of driving slide 9, so that guide curve 17 and locking curve 20 face away from each other. They also intersect, resulting in a through hole 21, see for a comparative shape of through hole 21 FIGS. 15-17. Locking curve 20 is used to couple or uncouple driving slide 9 to or from locking lever 22 by means of a coupling cam 23. Locking lever 22 controls the longitudinal movement of lever 7 of front device 5.

When coupling cam 23 is in horizontal curve portion 20' (in FIGS. 7 and 8), driving slide 9 can move with respect to locking lever 22, which is then locked with respect to guide rail 4 (by means of locking cam 24 in recess 25 in guide rail 4). When coupling cam 23 moves into inclined curve portion 20" of locking curve 20, locking lever 22 is locked with respect to driving slide 9 and unlocked from guide rail 4 (locking cam 24 is out of recess 25), so that both slides 9, 22 move as one in FIG. 9.

FIGS. 7, 8 and 9 show that guide cam 18 or 19 and coupling cam 23 are never at through hole 21 at the same time, so that they do not interfere with each other.

FIGS. 14-17 show that guide curve 17 and locking curve 20 have a depth that extends almost the complete thickness of the body of driving slide 9, i.e. substantially more than half the thickness of the body of driving slide 9. Because a body part on both sides of each curve 17, 20 remain at the intersection, cams 18, 23 will continue to follow its curve when passing the intersection at through hole 21.

From the foregoing it will be clear that the invention provides an operating mechanism for a roof system in which a slide may have a small thickness, while still including crossing curves, thus obtaining a small package in Y-direction (in transverse direction of the roof system). Despite the small package in Y-direction, the cams will be supported well, due to their depth of engagement into their corresponding curves.

The invention is not limited to the embodiment shown in the drawings and described above, which may be varied in different manners within the scope of the invention. Features of different embodiment may be combined in other ways. Cams and pins may have all kinds of shapes and are not limited to the cross-sectional shapes shown in the drawings. The curve construction could also be used in other operating mechanisms, such as for tilt-sliding roofs, spoiler roofs and the like. Other movements of the closure panel could be effected if desired. The cams may be provided on other parts of the operating mechanism, either both on the same part or on different parts.

What is claimed is:

1. A roof system for a vehicle having a roof opening in a roof part thereof, comprising:
   at least a closure which is movable between a closed position in which it closes the roof opening and an open position in which it opens the roof opening,
   an operating mechanism coupled to and configured to move the closure, the operating mechanism including:

at least a guide rail extending in a longitudinal direction of the roof system,
a closure support,
a slide which is slidable in the guide rail and cooperates at least with the closure support, said slide comprising a body and at least two curves provided in the body, the curves having such extent that the curves are non-parallel and cross each other between their ends, wherein the curves are arranged in substantially parallel walls of the body of the slide that face away from each other, and
at least two cams directed oppositely, wherein each cam engages one of said curves from an opposite side, at least one of the cams being provided on the closure support.

2. The roof system according to claim 1, wherein the curves and the body of the slide have such depth that the curves overlap each other in a depth direction of the body of the slide, such that the body will show a through hole at a position where the curves are crossing.

3. The roof system according to claim 2, wherein each curve has a depth that is larger than half of a thickness of the body of the slide.

4. The roof system according to claim 1, wherein both cams are provided on the closure support in a form of a lever, said lever being forked having two legs, one leg on each side of the slide and carrying one of the cams.

5. The roof system according to claim 1, wherein one cam is provided on the closure support to move the closure support when the slide is driven, and the other cam is provided on a locking member to lock the slide with respect to the guide rail.

6. The roof system according to claim 1, wherein the cams are each in a form of a cam having a circular cross-section.

7. The roof system according to claim 6, wherein the cams have a same cross-section.

8. The roof system according to claim 1, wherein the cams have different cross-sectional shapes and/or dimensions.

9. The roof system according to claim 1, wherein the curves each have two opposite substantially parallel side walls and a back wall, the back wall extending along at least a substantial part of a length of the curves.

\* \* \* \* \*